(12) United States Patent
Pearce et al.

(10) Patent No.: US 8,212,681 B2
(45) Date of Patent: Jul. 3, 2012

(54) AUTOMATED THEATER WARNING TECHNIQUE

(75) Inventors: James Edward Pearce, Bramley (GB); John Robert Naylor, Lake Oswego, OR (US); Stephen Burnside, Hillsboro, OR (US)

(73) Assignee: GVBB Holdings S.A.R.L., Luxembourg (LU)

(*) Notice: Subject to any disclaimer, the term of this patent is extended or adjusted under 35 U.S.C. 154(b) by 307 days.

(21) Appl. No.: 12/226,248

(22) PCT Filed: Apr. 12, 2006

(86) PCT No.: PCT/US2006/013746
§ 371 (c)(1),
(2), (4) Date: Oct. 10, 2008

(87) PCT Pub. No.: WO2007/117249
PCT Pub. Date: Oct. 18, 2007

(65) Prior Publication Data
US 2009/0289802 A1 Nov. 26, 2009

(51) Int. Cl.
*G08B 17/00* (2006.01)
(52) U.S. Cl. ............ 340/584; 340/691.6; 340/540; 340/539.22; 348/135; 348/152; 348/156

(58) Field of Classification Search ............ 340/539.22, 340/521, 539.26, 584, 540, 691.6; 348/135, 348/152, 156; 352/40; 353/15, 94, 122, 353/70
See application file for complete search history.

(56) References Cited

U.S. PATENT DOCUMENTS

| 6,669,346 | B2 * | 12/2003 | Metcalf ...................... 353/94 |
| 7,304,714 | B2 * | 12/2007 | Peterson et al. ............ 352/133 |
| 2003/0093789 | A1 * | 5/2003 | Zimmerman et al. ......... 725/34 |
| 2005/0088621 | A1 * | 4/2005 | Ikeuchi ........................ 353/15 |
| 2006/0059512 | A1 * | 3/2006 | Pugel ........................... 725/33 |
| 2006/0087428 | A1 * | 4/2006 | Wolfe et al. ............. 340/539.22 |
| 2006/0221302 | A1 * | 10/2006 | Paige et al. ................... 352/40 |

FOREIGN PATENT DOCUMENTS
JP 2004012695 1/2004

OTHER PUBLICATIONS
International Search Report, dated Jun. 12, 2007.

* cited by examiner

*Primary Examiner* — Hoi Lau
(74) *Attorney, Agent, or Firm* — Arent Fox LLP

(57) ABSTRACT

An automated theater warning technique makes use of a digital cinema projection system to provide a display of a visual message indicative of an emergency condition. Upon receipt of a trigger generated in response to an emergency condition, the digital cinema projection system automatically switches from displaying the feature presentation to displaying the visual message. The digital cinema projection system can advantageously display different messages responsive to different conditions.

12 Claims, 2 Drawing Sheets

AUTOMATED THEATER WARNING TECHNIQUE

This application claims the benefit, under 35 U.S.C. §365 of International Application PCT/US2006/013746, filed Apr. 12, 2006, which was published in accordance with PCT Article 21(2) on Oct. 18, 2007.

TECHNICAL FIELD

This invention relates to a technique for automatically displaying a message on a display screen via a theater projector in the event of an emergency.

BACKGROUND ART

Most present-day movie theaters typically possess some type of automated warning system for alerting theater patrons of an emergency condition such as a fire or the like. Such systems usually include one or more sensing devices, e.g., smoke detectors or heat sensors, connected to a controller that typically comprises the heart of an automation system. In response to an emergency condition detected by one or more sensing devices, such as the presence of excessive heat or smoke, the controller automatically will raise the theater house lights. At the same time, the controller will cause the movie projector to power off and thus cease operation. Additionally, the controller typically can trigger one or more warning devices, such as a strobe light, bell, siren, buzzer or any combination thereof.

Warning systems of the type described above have proven generally effective to alert theater patrons of the existence of an emergency condition, such as a fire or the like. However, such systems nonetheless suffer from the disadvantage of being unable to provide visual messages that could aid theater patrons in evacuating the theater. For example, in the event of a fire, displaying a message on the screen indicating the nature of the emergency and the specific location of theater exits could prove extremely useful.

The obvious mechanism for providing such a visual warning would be to make use of the theater's existing movie projector for this purpose. Unfortunately, most present day movie theaters utilize analog projection equipment ill-suited for this purpose. A typical analog motion picture projector operates to display a moving picture on the theater screen on by advancing a succession of individual images on the film past a projector lamp. Attempting to project a single frame on the screen for any extended period of time, such as a single frame containing a warning message would likely lead to damage to the film medium resulting from prolonged exposure to the intense heat of the projector lamp. Moreover, an additional problem exists in switching the film in the projector from the feature presentation to the film containing a warning message.

Thus a need exists for an automated warning system for use in a theater for automatically displaying a visual warning message.

BRIEF SUMMARY OF THE INVENTION

Briefly, in accordance with a preferred embodiment of the present principles, there is provided a method for automatically displaying a predetermined visual image, such as a warning message or the like, in a facility. The method comprises the step of initiating the display of the predetermined message by a digital cinema system in place of a feature presentation responsive to receipt of a trigger generated upon the detection of a prescribed condition, such as an emergency, for example a fire or other event warranting the display of warning message.

DETAILED DESCRIPTION

Figure 1:
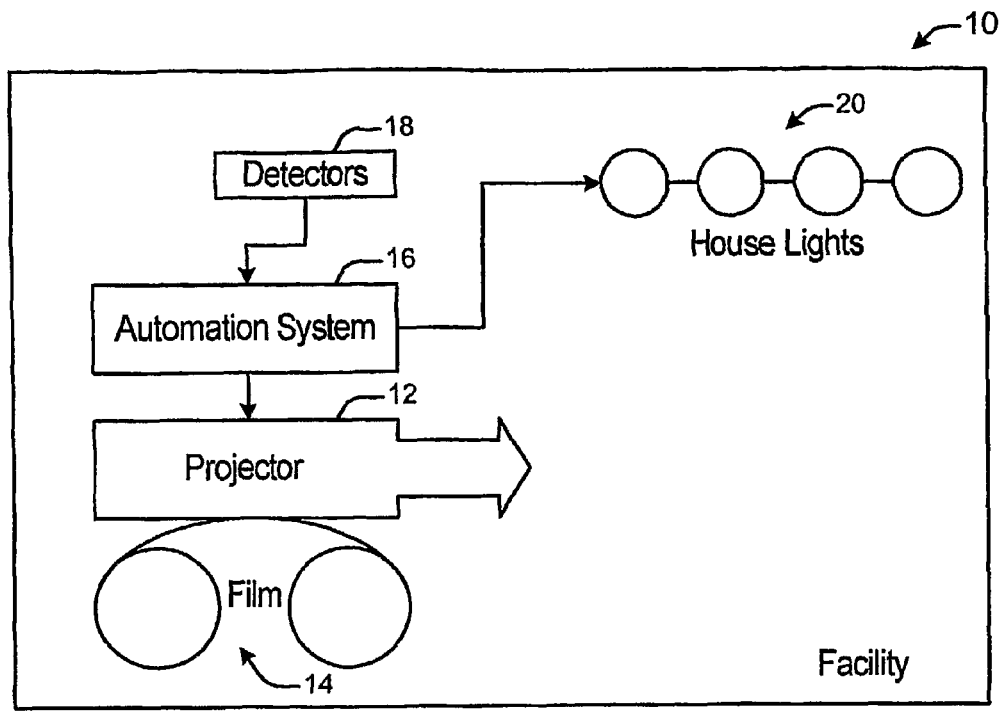
FIG. 1 depicts a block diagram of a movie theater that possesses an analog projector in accordance with the prior art.

FIG. 1 depicts a block diagram of a conventional motion picture theater 10 in accordance with the prior art. The theater 10 includes an analog movie projector 12 that operates to display a feature presentation carried on a film 14. The projector 12 displays the feature presentation by advancing the film 14 past a projector lamp (not shown) causing the image of the film to appear on a screen (not shown).

In addition to the projector 12, the theater 10 typically includes an automation system 16 responsive to at least one detector 18 that serves to sense physical conditions such as excessive heat or smoke indicative of a fire. Additional detectors 18 could exist within the facility 10 for sensing other types of emergency conditions, such as excessive water caused by flooding for example. Typically, the automation system 16 also can respond to external signals, such as those received from a weather station, civil defense authority, or any other source that provides signals indicative of an emergency condition that would warrant evacuation of the theater. In addition, the automation system 16 could also respond signals generated by systems (not shown) within the facility 10 indicating a loss or power, water, heat or other environmental condition that potentially could warrant evacuation.

In response to a trigger from one of the detectors 18 or a an external warning signal indicative of an emergency condition, the automation system 16 powers off the projector 12 and powers house lights 20 to their regular brightness. Under ordinary operating conditions, the house lights 20 undergo dimming on or before presentation of the feature film 14 by the projector 12. Thus, in the event of an emergency, returning the house lights 20 to their regular brightness becomes very important to aid theater patrons in evacuating the facility 10. In practice, the automation system 16 can comprise a processor or even a ladder-logic type controller capable of controlling the power provided to the projector 12 and to the house lights 20 in the manner just described.

As described previously, conventional theater facilities, such as facility 10 described with respect to FIG. 1, lack the ability to provide any type of visual warning message by making use of the projector 12. Providing a visual message, such as a warning indicative of the particular emergency, as well as a description of the theater exits would prove very helpful in the event of an emergency.

Figure 2:
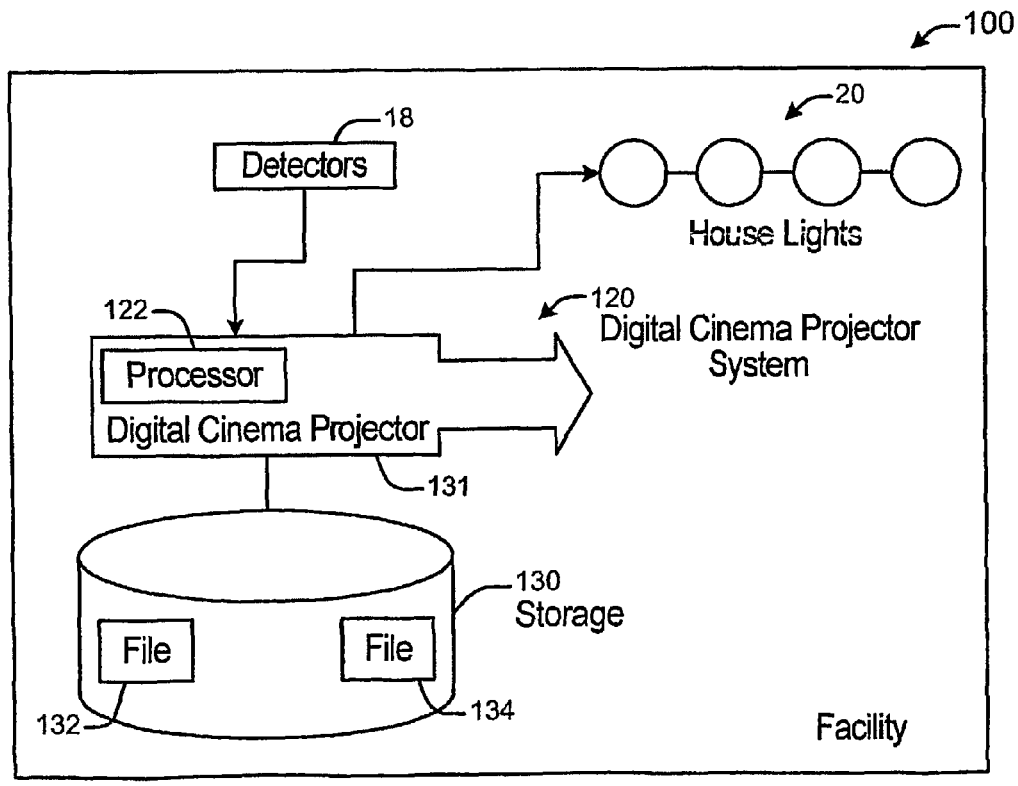
FIG. 2 depicts a block diagram of a movie theater that possesses a digital cinema projector for practicing the method of the present principles for automatically displaying a predetermined visual image.

FIG. 2 depicts a block schematic diagram of a digital cinema facility 100 capable of providing a visual message to theater patron warning of a condition, typically, but not limited to an emergency condition, in accordance with the present principles. The theater facility 100 includes a digital cinema projector system 120 as are known in the art. Such digital cinema projector systems typically include a processor or controller 122 that receives digitally encoded content stored in a file storage system 130. The processor 122 of the digital cinema projector system 120 provides such content to a digital projector 131 capable of displaying such digital content on a screen. Such projection systems can include micro-mirror devices, such as those manufactured by Texas Instruments.

Figure 3:
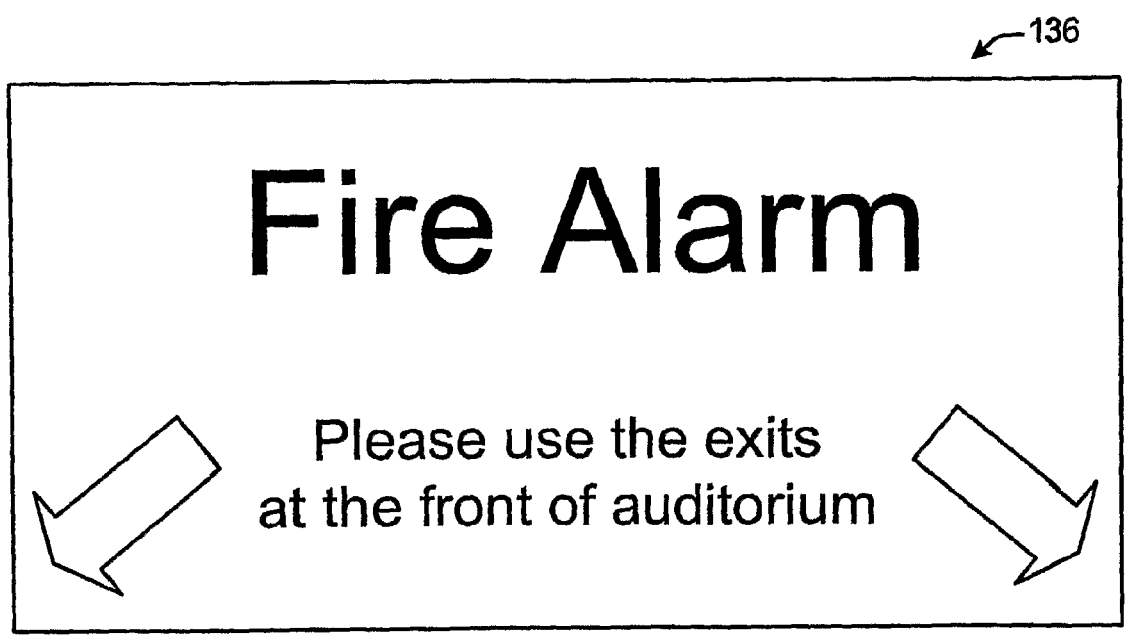
FIG. 3 depicts an example of the predetermined visual image displayed by the system of FIG. 2.

In accordance with the present principles, file storage system 130 stores at least one first file 132 that contains all or at least part of a feature presentation, i.e., a movie for example. The storage system 130 also stores at least one second file 134 containing data, which when received by the digital projection system 120, causes the digital projector 131 display a visual message 136 shown in FIG. 3. The visual message 136 of FIG. 3 will typically contain information, such as, but not limited to a warning, indicative of a particular type of condition that now exists. Thus in the event of a fire, for example, the visual message 136 would reflect that emergency condition and could include information such as the identification of theater exits. The second file 134 could contain other visual messages for other possible conditions, such as earth quake, power failure (assuming the existence of a back-up power source for the projector), tornado, etc.

The visual message 136 could also relate to condition associated with a run-time problem, i.e., an inability to display the feature presentation. For example, a Digital Rights Management conflict detected by the processor 122 would give rise to an internal trigger. Under such circumstances, processor 122 would initiate the display of a message associated with such a condition. Under such circumstances, the displayed visual message 136 could convey an apology for the interruption and ask for the audience to remain seated for the interim.

In addition to the visual message 136, the second file 132 could also include an accompanying audio file for playback during display of the visual, message. The accompanying audio file also would reflect the nature of the condition. Thus, the audio file could contain a aural request that the audience exit the theater, or remain in their seats, depending on the nature of the condition.

Like the conventional facility 10 of FIG. 1, the digital cinema facility 100 of FIG. 2 also includes one or more detectors 18 for sensing one or more emergency conditions of the type described previously with respect to FIG. 1, including, but not limited to a fire condition detected by excess smoke or heat. As depicted in FIG. 2, the detectors 18 send a trigger directly to the digital projection 120 for receipt by the processor 122 therein. Upon receiving a trigger from the detector, the processor 122 causes the projector 131 to switch between the content contained in the first file 132 to the associated message contained in the second file 134, thereby causing the digital projector 131 to immediately commence projecting the appropriate visual message 136. Thus, as soon as an emergency condition arises, as detected by one of the detectors 18, the projector 131 now projects the corresponding visual warning 136.

The processor 122 can respond to external signals, such as those received from a weather station, civil defense authority, or any other source that provides signals indicative of an emergency condition that would warrant evacuation of the theater. In addition, the processor 122 could also respond signals generated by systems (not shown) within the facility 10 indicating a loss or power, water, heat or other environmental condition that potentially could warrant evacuation. The processor 122 serve to control the house lights 20 to raise them to their regular brightness in response to a trigger from one of the detectors 18, or in response to an external signal. As discussed, the processor 122 can also respond to any internal trigger associated with a run-time issue and display the appropriate visual message 136 and accompanying audio file, if in existence.

The processor 122 within the digital projection system 120 advantageously possess the capability of the emergency functionality of the automation system 16 of FIG. 1, at least with respect to raising the brightness of the house lights in the event of an emergency condition. Movie theaters that undergo retrofitting from conventional analog equipment to a digital cinema projection system likely will have an existing automation system, such as automation system 16 of FIG. 1. Rather than have the newly provided digital projection system control the house lights, the existing automation system would perform that function. The power-off signal generated by the conventional automation system in the event of an emergency would trigger the retrofitted digital projection system to display the visual message 136 rather than powering off as in the case of the analog projector.

The foregoing relates to a technique for automatically displaying a message on a display screen via a theater projector in the event of an emergency.

The invention claimed is:

1. A method for automatically displaying a predetermined visual image in a theater facility, comprising:
    detecting whether one of a plurality of prescribed conditions has occurred during the
    display of a feature presentation in the theater facility, the feature presentation being stored in a
    first file at the theater facility;
    selecting among a plurality of warning messages stored in a second file at the theater
    facility—an appropriate warning message corresponding to the detected condition; and
    initiating the display of the selected appropriate warning message in the theater facility by a digital cinema system in place of the feature presentation responsive to the detected
    condition warranting display of the selected appropriate warning message.

2. The method according to claim 1 wherein a warning message corresponding to a fire condition is selected among the plurality of warning messages responsive to a detection of one of excessive smoke or heat.

3. The method according to claim 1 wherein the initiation of the display of the selected appropriate warning message comprises initiating the display of information of facility exits.

4. The method according to claim 1 wherein the prescribed condition constitutes a run-time problem.

5. The method according to claim 1 further comprising initiating a reproduction of an audio playback file to accompany the initiation of the display of the selected appropriate warning message.

6. A digital cinema projection system comprising:
    a storage system for storing at least a first file comprising at least part of a feature presentation and at least a second file comprising at least a plurality of warning messages with each warning message corresponding to a separate prescribed condition;
    a digital projector; and
    a processor controlling the digital projector and responsive to detection of whether one of a plurality of prescribed conditions has occurred for (1) selecting one of the plurality of warning messages corresponding to the detected condition and (2) causing the digital projector to cease execution of the first file and display a visual message from the second file corresponding to the selected warning message.

7. The system according to claim 6 wherein the processor selects a warning message among the plurality of warning messages corresponding to the presence of a fire upon detection of at least one of excessive smoke and heat condition.

8. The system according to claim 6 wherein the visual message comprises a warning message among the plurality of warning messages indicative of an emergency condition.

9. The system according to claim 6 wherein the visual message comprises a warning message among the plurality of warning messages indicative of a fire.

10. The system according to claim 7 wherein the warning message includes information of facility exits.

11. The system according to claim 6 wherein the prescribed condition constitutes a run-time problem.

12. The system according to claim 6 wherein the processor causes the digital projector to reproduce an audio playback file to accompany the display of the visual message.

* * * * *